Aug. 29, 1967   H. F. PRASSE   3,337,938
METHOD OF MAKING PISTON RINGS
Filed May 29, 1964   2 Sheets-Sheet 1
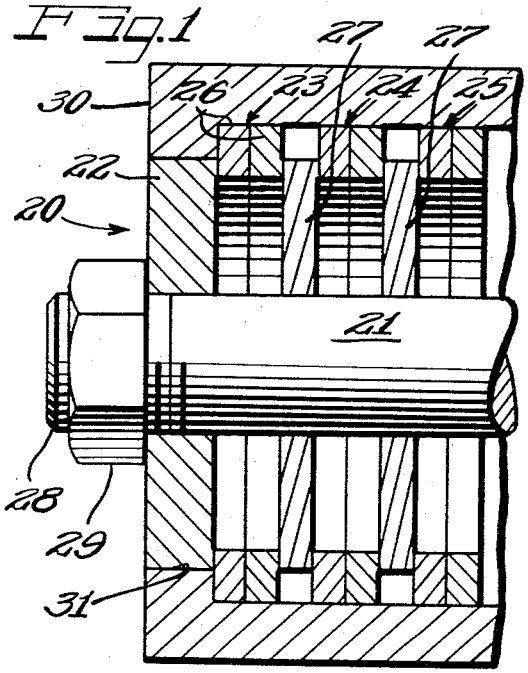
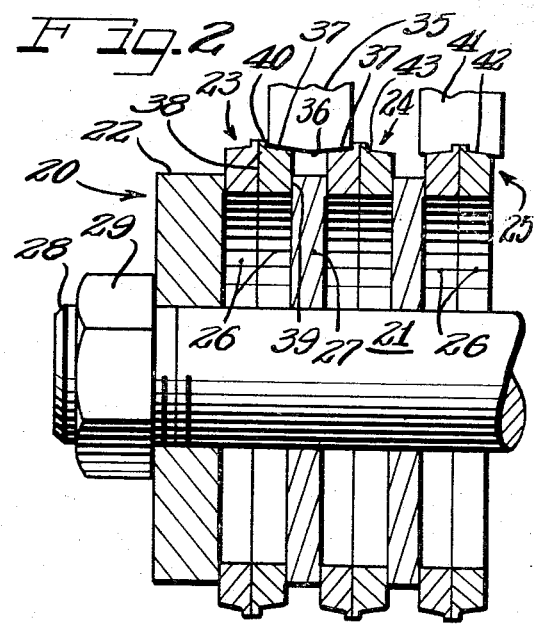
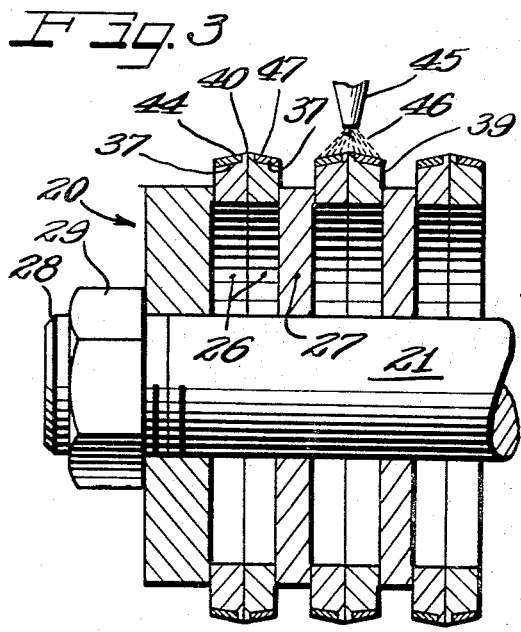
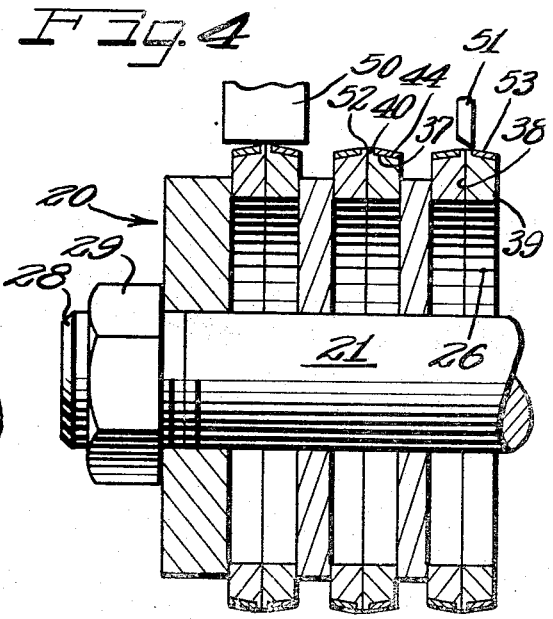
INVENTOR.
Herbert F. Prasse Aug. 29, 1967  H. F. PRASSE  3,337,938
METHOD OF MAKING PISTON RINGS
Filed May 29, 1964  2 Sheets-Sheet 2
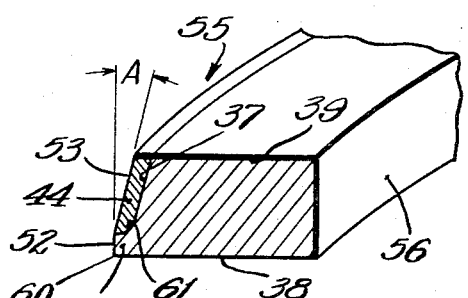
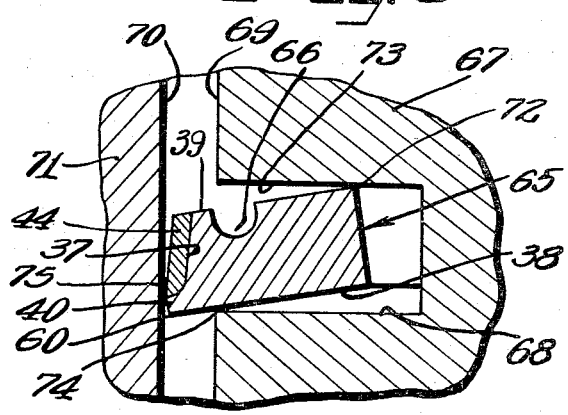
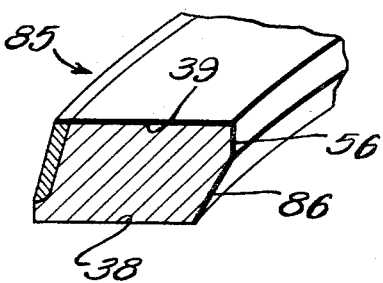
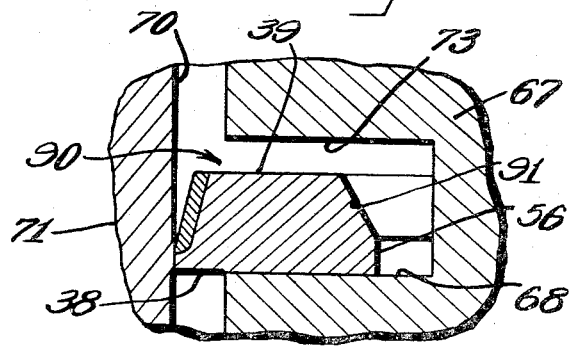
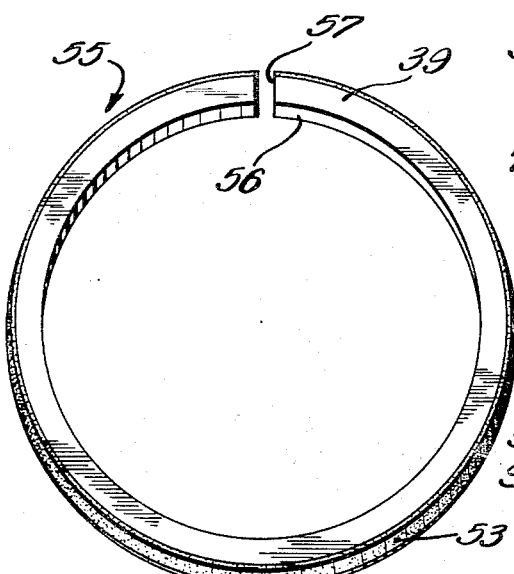
INVENTOR.
Herbert F. Prasse
BY
ATTORNEYS

United States Patent Office 3,337,938
Patented Aug. 29, 1967

3,337,938
METHOD OF MAKING PISTON RINGS
Herbert F. Prasse, St. Louis, Mo., assignor to Ramsey Corporation, St. Louis, Mo., a corporation of Ohio
Filed May 29, 1964, Ser. No. 371,231
8 Claims. (Cl. 29—156.6)

This invention relates to a piston ring and to a method of making the same. More particularly the invention relates to a compression ring adapted to be used in a ring groove of a piston and provided with an upwardly and radially inwardly inclined outer peripheral surface, a first portion of which is constituted by the metal of which the ring is formed and a second portion of which is constituted by a harder metal or alloy preferably of higher melting point than chromium. The metal constituting the first portion is preferably a cast iron and it is this portion that provides the wearing-in surface for initial wiping or scraping contact with the wall of the cylinder in which the piston operates. Thereafter, the higher melting point and more wear-resistant material of said second surface portion comes into contact with the cylinder wall, thereby prolonging the useful life in service of the compression ring.

It has heretofore been proposed as in the Swartz et al. Patent No. 2,798,779, to provide a compression ring having an upwardly and inwardly inclined outer peripheral surface constituted by the metal of which the ring is formed. However, since piston rings are usually formed of a cast iron that is not especially resistant to abrasion nor of relatively higher melting point than the metal of the cylinder wall, such rings wear rather rapidly in service, and therefore have a relatively short useful life in service. While it is known to chromium plate piston rings to increase their resistance to abrasion and wear, even though chromium has a relatively high melting point, about 3362° F. as against 2066° F. for a cast iron, scuffing is still likely to take place. Scuffing is caused by localized welding of the boundary layer of the ring material with the metal of the cylinder during periods of very high temperature operating conditions, such as may occur when lubrication is borderline or below.

It is therefore an important object of this invention to provide compression rings of novel and improved construction wherein during the initial, wearing-in stage the metal of which the ring is formed is in wiping contact with the cylinder wall, but wherein after such wearing-in period, a more wear-resistant and a higher melting point metal or alloy with which the outer peripheral surface of the ring is faced, takes over the wiping and scraping function of the ring.

It is a further important object of this invention to provide a simple and relatively inexpensive method of manufacturing compression rings having a tapered outer peripheral surface providing an initial wiping and scraping edge of a relatively soft, non-wear-resistant material during the wearing-in stage and providing a subsequent wiping or scraping edge and surface that is formed of a relatively highly wear-resistant and refractory material that will increase the useful life of the rings and their resistance to scuffing.

It is a further important object of this invention to provide a compression ring having a tapered, multi-function outer peripheral face and having an annular body of such cross-section as to convert the ring into a torsion type of ring in service and thereby effect a better seal between the piston and the cylinder wall against the escape of oil upwardly past the ring and against entry of the oil into the ring groove.

Other and further important objects of this invention will become apparent as the description of the accompanying drawings proceeds, in which like parts are designated by like reference numerals and in which:

FIGURE 1 is a fragmentary, cross-sectional view, with parts in elevation, of a suitable form of arbor for the mounting thereon of piston rings in spaced pairs, together with spacer rings for spacing said pairs of piston rings and together with a conventional split bushing for holding the rings in centered position with reference to end collars;

FIGURE 2 is a similar fragmentary, cross-sectional view, with parts in elevation, but with the split bushing removed and with grooving tools illustrated in position for appropriately grooving the external peripheral surfaces of two of the piston rings at a time;

FIGURE 3 is a similar fragmentary, cross-sectional view, with parts in elevation, illustrating a subsequent step of spraying the grooved peripheral surfaces of the piston rings with a relatively highly wear-resistant and high melting point metal to fill the grooves of said rings and form a continuous surface coating over the entire external surface of the rings;

FIGURE 4 is a similar fragmentary, cross-sectional view, partly in elevation, illustrating a subsequent machining or abrading step whereby the excess of the sprayed metal is removed to expose the metal of the rings as an edge surface that forms a scraping or wiping lip with the surface of the rings that is the lowest surface of the rings in use;

FIGURE 5 is a fragmentary view of a finished piston ring showing in cross-section the tapered, multifunctional external surface of the ring;

FIGURE 6 is an enlarged fragmentary, cross-sectional view of a piston and cylinder wall with a ring-receiving groove in the piston and a ring in the groove that is similar to that illustrated in FIGURE 5 but provided on its upper planar face with an annular recess adjacent to the tapered external surface of the ring and adapted to convert the ring into a reverse torsion type of ring;

FIGURE 7 is an enlarged fragmentary view of a modified form of compression ring, illustrating in cross-section a contour of ring but also, like the ring of FIGURE 6, converts the ring into a reverse torsion type of ring;

FIGURE 8 is an enlarged, fragmentary, cross-sectional view, similar to that of FIGURE 6 but illustrating a further modification of compression ring so contoured in cross-section as to convert the ring into a positive torsion type ring, the modified form of ring being shown in the position that it would assume during the firing stage of a four-cycle engine;

FIGURE 9 is a view similar to that of FIGURE 8 with the ring illustrated in its position during the inlet, compression and exhaust strokes of the engine; and FIGURE 10 is a perspective plane view of the compression ring shown in cross-section in FIGURE 5.

As shown on the drawings:

The reference numeral 20 indicates generally an arbor, comprising a rotatable shaft 21 adapted to be driven by suitable means (not shown), on which are mounted end clamping plates of which only the plate 22 is illustrated. Sets of plain rings 23, 24 and 25, each comprising a pair of identical rings 26, are mounted upon the shaft 21 with spacer plates 27, 27 between the sets 23 and 24 and between the sets 24 and 25, and so on. The free end of the shaft 21 is threaded, as at 28 for receiving an internally threaded nut 29, which serves, by being tightened up against the end clamping plate 22 to hold the sets of rings 23, 24 and 25 and the spacer plates 27, 27 in assembled relationship. Before tightening up on the nut 29, however, a split bushing 30 of conventional design is placed about the preliminary assembly of rings and spacer plates and the halves of the bushing are forced together about the end clamping plate 22 into conforming surface contact therewith, as at 31, to center the sets of rings 23, 24 and 25 properly with respect to the axis of the shaft 21. After this centering step has been carried out the nut 29 is then tightened to hold the assembly in properly centered relationship, and the split bushing 30 is removed.

In the first stage of processing the rings 26, 26, the outer peripheral surfaces of the rings, mounted as described upon the shaft 21 of the arbor 20, are grooved, as by an abrading or grinding action, or by a machining operation. The reference numeral 35 indicates a grinding wheel having a working face 36 that tapers radially outwardly from each lateral side toward a median plane of the wheel to form a groove 37 in each of two rings 26 on either side of a spacer ring 27. Each of said grooves 37 extends from a point adjacent to the inner lateral face 38 of a ring 26, across the outer peripheral surface thereof to the outer lateral face 39 of the ring. At the completion of the grooving operation, therefore, a radially projecting, annular rib 40 is left adjacent the inner lateral surface 38 of each ring 26, with the groove 37 extending from said ridge through the opposite lateral surface 39 of the ring. As will be explained later on, the lateral surface 38 becomes the lower surface of the ring when in use, while the lateral surface 39 becomes the upper surface of the ring in use.

Instead of using a grinding wheel, such as the wheel 35 for forming the grooves 37, 37, a machine tool 41 may be employed (FIG. 2), and the tool may be of such peripheral contour, as at 42, as to groove simultaneously a pair of abutting piston rings 26, 26 of the set 25. It will be understood, of course, that either a grinding wheel or a machine tool may be used for grooving purposes, and that both would not ordinarily be used at the same time on the rings mounted on the same arbor, but both types of grooving tools have been shown in FIG. 2 for purposes of illustration only. Whether formed by one or the other type of tool, each of the grooves 37 can be produced with the same contour and dimensions. While the grooves 37 shown in FIG. 2 have a relatively sharp-angled junction, as at 43, with the rib 40 left on each of the rings 26, this showing is merely a result of the reduced size of the drawings, and, as will more clearly appear hereinafter, the annular junction 43 preferably is formed upon a radius to provide a fillet, rather than a sharp angle.

In the next stage of the method, as illustrated in FIG. 3, the grooves 37, 37, of each pair of rings 26, 26, are filled with a wear-resistant, high melting point material, indicated by the reference numeral 44. This coating operation is preferably carried out by means of a spray gun 45, capable of spraying a molten material 46 over the entire peripheral surface of the pairs of rings 26, 26 not only to fill the grooves 37 with the material 44 but to form a continuous layer 47 over the entire outer annular surface of each ring, including the ribs 40. The coating over the ribs 40 is not indicated on the drawings, since, as will be pointed out later, very little, if any, of the sprayed metal adheres to the rib edge surface.

In the next stage of the method, as illustrated in FIG. 4, the excess, if any, of material 44 over the ribs 40 is removed, as by a grinding wheel 50 or by a suitable machine tool 51. By whatever means it is accomplished, the metal of the body of the piston rings 26, 26, is left exposed along the narrow annular edge surface of each of the ribs 40, as at 52. The material 44, however, is left in the grooves 37 with the peripheral surface 53 of said groove-filling layer sloping radially inwardly toward the lateral surface 39 of each of the rings 26.

After the completion of this final stage of the method, as illustrated in FIG. 4, the rings 26, 26, are removed from their arbor 20 by disassembling the same. The ring, at this stage, is like the ring 55 (FIG. 10) and has an appearance in cross-section like that illustrated in FIG. 5. As best shown in the latter figure, the surfaces 38 and 39 constitute the lower and upper parallel, planar surfaces of the ring 55, with the outer peripheral surface of the ring defined by the narrow annular edge surface 52 of the rib adjacent the lower surface 38, and by the radially inwardly and upwardly inclined surface 53 of the material 44 filling the groove 37 that extends to the upper surface 39 of the ring. The radially inner surface of the ring 55 is defined by a right-cylindrical surface 56. As illustrated in FIG. 10, the ring 55 is parted transversely, as by a narrow gap 57. While the gap 57 is shown only in FIG. 10, it will be understood that the rings 26, 26 prior to mounting upon the arbor 20 also are provided with gaps, and the gaps are in random orientation to one another as the rings are stacked, or assembled on the arbor.

With respect to the materials used in making piston rings in accordance with the method of my invention, the rings are generally formed of a suitable cast iron in accordance with usual practice. In general, a suitable cast iron will have a hardness equivalent to a Rockwell B of from 90 to 110, a minimum tensile strength of about 50,000 p.s.i. and a minimum modulus of elasticity of about 12,000,000 as measured on a test piece 2½ to 5½ inches in diameter. After being cast, the rings are conditioned by heat treatment, if necessary, and turned, bore, split, disc-ground, all in a manner as specified by the ring blank specification.

Before being mounted on the arbor 20, as previously described, each of the rings 26 is provided with a phosphate coating, which may be a manganese, zinc or other suitable phosphate coating. As a result of the phosphate coating operation, all of the exposed surfaces, including the surfaces of the gap 57, of each ring are provided with a continuous rust-preventive and oil-retaining coating. This surface coating performs the additional function of preventing the adherence of the sprayed material (FIG. 3) to the surfaces so coated. The sprayed material adheres well, however, to those freshly exposed surfaces, such as the surfaces of the groves 37 (FIG. 2) that have been formed by grinding or machining. Since the sprayed material does not stick or adhere to the lateral surfaces 39 or to the surfaces of the gap 57, there is no need for a subsequent side grinding operation to remove coated material from these surfaces.

The material that is preferably used in the spraying operation illustrated in FIG. 3 is metallic molybdenum, but any suitable high melting point metal or alloy, preferably having a higher melting point than that of chromium, which is about 3362° F., may be used. Exemplary of such other metals may be mentioned tantalum, having a melting point of about 5162° F., tungsten having a melting point of about 6120° F., and osmium having a melting point of about 4792° F. Of these, molybdenum and tungsten are preferred, but all four metals are superior to chromium, not only because of their high melting points and resistance to abrasion, but also because of their high hot-hardness. As compared with chromium, the hardness of which drops rapidly at above about 600° F., the hardness of molybdenum, tungsten, tantalum and osmium coatings stands up well at temperatures higher than the figure mentioned. At usual room temperatures, molybdenum coatings have a hardness in the neighborhood of 943 Vickers at 10 kg. load. This is well in excess of 1,000 B.H.N., as compared with the hardness of a chromium plate of the so-called hard chromium type, which may be about 825 Vickers at a 10 kg. load. The other wear-resistant metals named are also harder than chromium.

As mentioned, previously, however, hardness alone is not the primary consideration. Perhaps the main advantage of providing a molybdenum coating is the high hot-hardness and high melting point of the coating. Possession of the latter property renders the facing material extremely resistant to scuffing, which, as previously pointed out, is caused by localized welding of the boundary layer of the ring material with the material of the cylinder during periods of very high operating temperatures and borderline lubrication.

As to the face angle for face-tapered rings, such as the ring 55 (FIG. 5), the taper is generally the minimum required to give a lower edge contact of the ring, as at the edge 60, with the wall of the cylinder bore. This angle, indicated by the reference letter A, may be as little as 1° for plain rings of rectangular section, or even as small as 0°30' for positive torsion rings, or as little as 1°30' for reverse torsion rings. The maximum taper, generally speaking, should not be in excess of 3°. For manufacturing reasons, it may be advantageous to approach the larger angle of taper, but if the ring is to be either a positive or a negative or a reverse torsion ring, as will hereinafter be explained, the angle for the taper will be dependent upon the twist angle that is given or imparted to the ring.

With further reference to FIG. 5, it will be seen that the groove 37 is provided adjacent the rib 52 with a radius fillet 61. Such a radius fillet is preferred to a sharp-angled junction, such as the junction 43 (FIG. 2), since a radius surface makes possible improved adherence of the sprayed material 44 to the surface of the groove 37 throughout the extent of such surface. However, so long as there is no reentrant angle formed at the junction 43 between the surface of the groove and that of the rib, satisfactory adherence of the sprayed metal at such junction can be obtained. The preferred depth of the groove 37 should be such as to provide a minimum hard surface coating of 0.001 to 0.012 inch in the finished ring. These dimensions have, of course, been greatly exaggerated for purposes of clarity in illustrating the invention in the drawings.

In FIG. 6 there is illustrated a reverse torsion ring 65 which is, in general, similar to the ring 55 (FIG. 5) except that the ring has been provided with an annular groove 66 in the upper planar surface 39. While the groove 66 is shown as near, but not contiguous to the upper end of the groove 37, it may actually intersect the groove 37.

Still referring to FIG. 6, the reference numeral 67 indicates a piston having a ring-receiving groove 68, in which the ring 65 is shown mounted for sealing the clearance between the wall 69 of the piston 67 and the wall 70 of the cylinder 71. The ring 65 is illustrated in the normal position that the ring will assume during the suction, exhaust and compression stroke in a four-stroke cycle engine. The groove 66 in the outer portion of the upper face 39 of said ring 65 causes the ring to dish downwardly at the outer diameter and upwardly at the inner diameter. While the illustration is exaggerated, the contact between the surfaces of the ring 65 and ring-receiving groove 68 will be substantially as shown, namely a contact at 72 between the inner upper edge of the ring 65 and the upper, planar, annular wall 73 of the groove 68, inwardly of the wall 69 of the piston. On the underside of the ring 65, contact occurs, as at 74, between the lower surface 38 of the ring and the outer lower edge of the ring groove 68. With the ring 65 reversely twisted, as illustrated in FIG. 6, initial contact between the ring 65 and the cylinder wall 70 occurs at or closely adjacent to the outer lower edge 60 of the ring, namely between the cast iron of the ring 65 and the material of the cylinder wall 70. It is advantageous that this be so during the initial or wearing-in period of use of a new engine, or an old engine with new compression rings, since cast iron is relatively soft, as compared with the facing material 44. After a suitable wearing-in period, the cast iron of the rib 40 exposed to wearing contact with the wall 70 of the cylinder, wears away to an extent such that the hard facing material 44 comes into wiping and scraping contact, as at 75. Regardless, however, of the state of wear of the outer peripheral surface of the ring 65, the ring will assume substantially the position illustrated in FIG. 6 during the suction, exhaust and compression strokes, the twist of the ring being such as always to maintain a seal, as at 74, against the lower ring land 68 thus preventing oil from entering the ring groove. During the power stroke, illustrated in FIG. 8 with a different type of ring, the explosion pressure will cause the ring 65 to lie flat in the groove with the lower surface 38 of the ring lying flat against the lower land 68 of the groove.

In FIG. 7 there is illustrated another form of reverse torsion ring, indicated by the reference numeral 85, which has been made from the ring 55 (FIG. 5) by providing a chamfer, or bevel 86, on the inner peripheral surface 56 extending from a point below the upper planar surface 39 downwardly and radially outwardly to meet the lower planar surface 38. The ring 85, like the ring 65 (FIG. 6) assumes a downwardly dished position toward the outside diameter and an upwardly dished position toward the inside diameter during the suction, exhaust and compression strokes of a four-stroke cycle engine.

FIGURES 8 and 9 illustrate a positive torsion ring, identified by the reference numeral 90, which is similar to the ring 85 except that the chamfer, or bevel 91 on the inner peripheral surface 56 of the ring 90 slopes upwardly and radially outwardly from a point slightly spaced above the lower planar surface 38 of the ring until it joins the upper planar face 39 of the ring. As before, the ring 90 is shown mounted in a ring-receiving groove of a piston 67 for sealing engagement with the wall 70 of a cylinder 71.

In the case of a positive torsion ring, such as the ring 90, the chamfer 91 along the upper portion of the inner peripheral wall of the ring causes the ring to dish upwardly at the outside diameter (FIG. 9) to establish contact, as at 92, with the outer peripheral edge of the upper land 73 of the ring groove, and also to establish contact, as at 93, between the outer peripheral edge of the lower ring surface 38 and the wall 70 of the cylinder. The position illustrated in FIGURE 9 is that assumed by the ring 90 during the suction, exhaust and compression strokes, while the position of the ring 90 illustrated in FIGURE 8 is that assumed during the power stroke, when the explosion pressure causes the ring to be seated flat in the groove against the lower land 68. Instead of a chamfer or bevel such as at 91, the radially inner periphery of the ring may be counter-bored to convert the ring into a torsion ring.

In view of the familiarity of workers in this field with the terms "reverse" and "positive" torsion, as applied to compression rings, it is not believed necessary to make any extended explanation of these terms or what causes the rings to assume the dished positions corresponding to those assumed by the reverse and positive torsion rings. In general, when the ring is closed, or substantially so, as in operation, the outer arcuate peripheral surface of the ring will tend to be twisted upwardly while the inner peripheral arcuate surface of the ring will tend to be twisted downwardly to cause the ring to assume the dished appearance illustrated in FIG. 6 for a reverse torsion ring, while the twisting will occur in the opposite direction to cause the ring to assume an oppositely dished position as illustrated in FIG. 9 if the ring is converted into a positive torsion ring. The illustrations have had to be greatly exaggerated to show the positions assumed by the positive and reverse torsion rings, but it will be understood that maximum clearances between the upper and lower planar surfaces of the ring and the corresponding upper and lower lands of the ring-receiving groove are only a few thousandths of an inch at the most.

In describing the outer peripheral surface of the rings of my invention, the term "multi-function" has been used to indicate that several functions are performed by the outer peripheral surface due to the different characteristics of different portions thereof, namely the wearing-in function performed by the metal of the body of the ring exposed, as it is during initial period of use, along the annular rib, and the subsequent function of wiping and scraping performed by the more wear-resistant, higher melting point material that froms the facing for the rest of the peripheral surface of the ring. It is due to these many functions that are performed by the compression ring of my invention that the ring has superior characteristics in service, both during the wearing-in period and also during the continued life of the ring in service.

It will be understood that modifications and variations may be effected without departing from the spirit and scope of the novel concepts of the present invention.

I claim as my invention:

1. The method of making a compression ring, which comprises
   assembling plain metal rings of a foundation metal in spaced multiples about a common axis with the rings of each multiple in lateral surface abutting relationship,
   rotating said rings,
   simultaneously grooving the peripheral edge-surfaces of a plurality of the rings to provide a raised rib projecting radially from one lateral surface of each ring and an edge face inclined toward the other lateral surface of each ring, during continued rotation of said rings spraying a wear-resistant metal into the grooves so formed to fill the same with said wear-resistant metal, and form a layer of such metal over the peripheral edge surfaces of the rings sprayed, and
   removing any excess of wear-resistant metal without removing metal from within said grooves to expose the foundation metal of each ring along the edge surface of its raised rib.

2. The method of claim 1, wherein the wear-resistant metal is selected from the group consisting of molybdenum, tungsten, tantalum and osmium.

3. The method of making piston rings, which comprises
   forming rings of a cast iron, each with a transverse gap in said ring,
   applying to all surfaces of said rings a phosphate coating,
   assembling a plurality of said rings in spaced sets about a common axis with the gaps in said rings positioned at random,
   grooving the outer peripheral surfaces of said rings while leaving exposed annular ribs at corresponding ends of said grooves,
   spraying a high melting point metal against the resulting peripheral surfaces of said ribs and grooves to fill said grooves with said metal,
   removing any sprayed metal from the peripheral surfaces of said ribs to expose the cast iron therebeneath, and
   separating the rings so produced,
   the phosphate coating on the ungrooved surfaces of said rings inhibiting adherence of said sprayed metal to other than those surfaces formed by grooving.

4. The method defined by claim 3, wherein the metal sprayed is a metal of higher melting point than chromium.

5. The method defined by claim 4, wherein, the grooving is so carried out as to leave the peripheral bottom surfaces of said grooves inclined radially inwardly toward the ring surface that constitutes the upper surface of the ring in service.

6. The method defined by claim 5, wherein, the metal sprayed is selected from the group consisting of molybdenum, tungsten, tantalum and osmium.

7. The method of making a compression ring which comprises
   assembling plain metal rings of a foundation metal in spaced multiples about a common axis with the rings of each multiple in lateral surface abutting relationship,
   rotating said rings,
   simultaneously grooving the peripheral edge surfaces of a plurality of the rings to provide an edge face inclined toward one lateral surface of each ring,
   during continued rotation of said rings spraying a wear-resistant metal into the grooves so formed to fill the same with said wear-resistant metal, and form a layer of such metal over the peripheral edge surfaces of the rings sprayed,
   removing any excess of wear-resistant metal without removing metal from within said grooves to expose the foundation metal of each ring along an edge surface adjacent the other lateral surface thereof, and
   grooving an upper surface of the resulting ring to provide an annular groove near the filled-in groove to convert said ring into a torsion ring in use.

8. The method of making a compression ring which comprises
   assembling plain metal rings of a foundation metal in spaced multiples about a common axis with the rings of each multiple in lateral surface abutting relationship,
   rotating said rings,
   simultaneously grooving the peripheral edge surfaces of a plurality of the rings to provide an edge face inclined toward one lateral surface of each ring,
   during continued rotation of said rings spraying a wear-resistant metal into the grooves so formed to fill the same with said wear-resistant metal, and form a layer of such metal over the peripheral edge surfaces of the rings sprayed,
   removing any excess of wear-resistant metal without removing metal from within said grooves to expose the foundation metal of each ring along an edge surface adjacent the other lateral surface thereof, and
   removing a portion of the upper radially inner peripheral edge face of the resulting ring to convert said ring into a torsion ring in use.

References Cited

UNITED STATES PATENTS

| | | | |
|---|---|---|---|
| 1,151,737 | 8/1915 | Thomas. | |
| 2,905,512 | 9/1959 | Anderson | 29—156.6 X |
| 2,919,486 | 1/1960 | Banquarel | 29—156.6 |

JOHN F. CAMPBELL, *Primary Examiner.*

P. M. COHEN, *Assistant Examiner.*